Aug. 9, 1932.    L. LUNSFORD    1,870,369
WINDSHIELD WIPER
Filed July 6, 1931
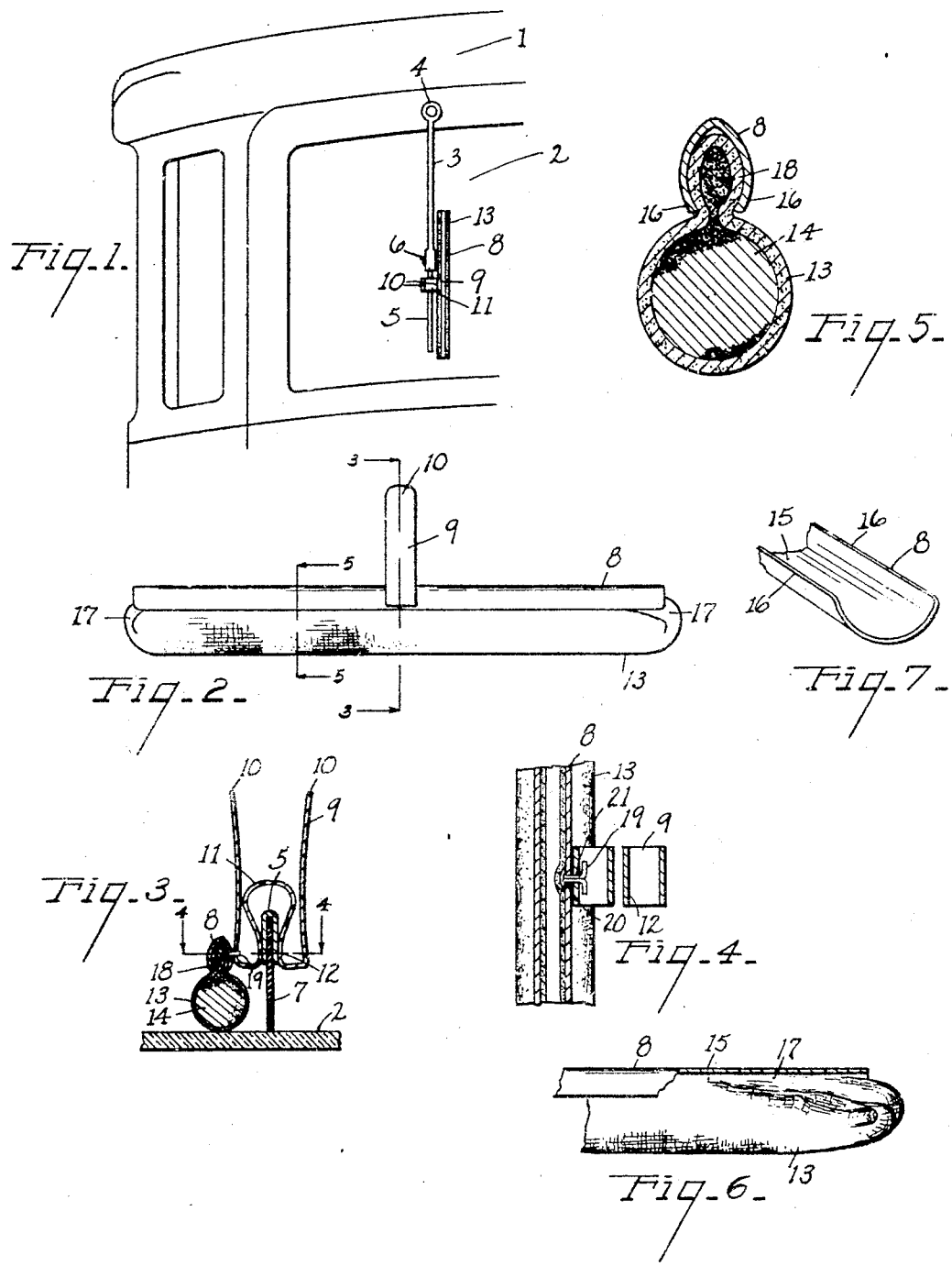
INVENTOR
Louis Lunsford
BY
Chappell Earl
ATTORNEYS Patented Aug. 9, 1932

1,870,369

UNITED STATES PATENT OFFICE

LOUIS LUNSFORD, OF MUSKEGON, MICHIGAN, ASSIGNOR TO LUNSFORD MANUFACTURING COMPANY, OF MUSKEGON, MICHIGAN

WINDSHIELD WIPER

Application filed July 6, 1931. Serial No. 548,758.

The main object of this invention is to provide a windshield cleaner which is very efficient in removing or preventing the accumulation of ice, sleet and snow from windshields and providing for clear vision.

A further object is to provide an attachment for windshields which is adapted for use in connection with numerous makes of windshield wipers of the squeegee type.

Another object is to provide novel and effective clip attaching means for adjustably securing my auxiliary windshield wiper to the main windshield wiper.

A still further object is to provide a method of making windshield wipers which is simple and economical and which prevents the escape of salt from the ends of the wiper unit.

Objects relating to details and economies of my invention will appear from the description to follow. The invention is defined and pointed out in the claims.

A structure which is a preferred embodiment of my invention is illustrated in the accompanying drawing, in which:

Fig. 1 is a fragmentary front elevation of a motor vehicle with my wiper in operative relation thereon.

Fig. 2 is an enlarged side elevation of the auxiliary wiper with the mounting clip thereon.

Fig. 3 is a fragmentary section on line corresponding to line 3—3 of Fig. 2.

Fig. 4 is a fragmentary longitudinal section on line 4—4 of Fig. 3.

Fig. 5 is an enlarged section on line 5—5 of Fig. 2.

Fig. 6 is an enlarged fragmentary view partially broken away illustrating the method of assembling the porous flexible salt container in position by the supporting member, and, Fig. 7 is a fragmentary perspective view of the wiper supporting member before it has been rolled or pressed into operative engagement with the salt container.

In the accompanying drawing, 1 represents a motor vehicle body and 2 the windshield thereof. The supporting arm 3 of the windshield wiper is pivotally mounted at 4 and is preferably automatically driven, the driving means however not being illustrated.

The main wiper blade holder 5 is pivotally mounted on the arm 3 at 6 and the wiper blade 7 and is of rubber or other flexible material as is commonly used in wipers of this character.

I provide a channel-shaped auxiliary holder 8 with an attaching clip 9 the holder being a stamping and the clip being of spring steel. The attaching clip 9 is of W-cross section to adjustably and frictionally engage the main holder 5 so that the clip may be adjusted to any desired position thereon and engaged with a wide variety of holders.

The side portions 10 of the clip 9 project beyond the central portion 11 so as to constitute finger pieces for opening and closing the central clamping portions 12 thereof. The position of the clip may be easily and readily changed by merely grasping the projecting portions 10 thereof with the fingers and forcing them toward each other. This opens the space between the clamping portions 12 so that the position of the clip may be changed or the clip applied or removed. The clip is of spring material so that when the finger pieces 10 are released, the clamping portions secure the clip firmly in place.

I provide a tubular container or bag 13 for salt or other granular material indicated at 14, this container being a section of knitted seamless tubing having open ends. The container 13 is partially filled with the granular salt 14 and then the ends of the tube are folded inwardly so as to overlap the filled part of the tube and lie in the bottom of the channel-shaped auxiliary holder 8 which is clamped upon the tube.

The channel-shaped auxiliary holder is initially a strip of sheet metal which is partially folded inwardly so as to form a channel having a web 15 and side flanges 16 as clearly illustrated by Fig. 7. The ends 17 of the bag are folded inwardly as indicated by Fig. 6 and the bag is placed in the open channel-shaped member 8 so that the ends 17 lie adjacent the web 15 of the channel. The flanges 16 are then rolled or forced together as indicated by Fig. 5 so as to engage a longitudinal portion 18 of the bag and its contents and to lock the ends 17 securely in place.

When formed in this manner, there is no likelihood of the ends 17 becoming loose so as to permit the salt to spill from the wiper. This step obviates expensive sewing and the like for closing the ends of the bag.

The attaching clip 9 and the auxiliary holder 8 are pivotally connected by means of a cotter pin 19 which extends through aligned holes 20 and 21 in the side walls of the auxiliary holder 8 and the clip 9 respectively. The hole 20 is preferably punched in the holder 8 before the latter is formed and the cotter pin 19 is preferably inserted in this hole before it is rolled or clamped upon the salt bag as described above.

The tube being of knitted fabric is quite porous so that moisture readily penetrates into the salt, dissolving a sufficient quantity thereof so that any ice or snow accumulating on the windshield is readily melted or dissolved. The blade 7 acts to wipe off the excess moisture.

While I prefer to use salt, other granular materials which will cause ice or frost to dissolve may be employed. The granular material enclosed in the flexible tube allows the tube to conform effectively to the mounting of the auxiliary holder or supporting member thereon. The W-shaped clip permits the necessary adjustment of the auxiliary wiper to blade holders of different character and to secure the desired contact of the auxiliary wiper with the window as it will be observed that the clamping portions 12 have a wide range of adjustment on the holder 5.

I have not attempted to illustrate certain changes and modifications which may be made in the details of construction and design of the above specifically described embodiment of my invention as it is believed that such changes will be readily understood from this disclosure.

Having thus described my invention, what I claim as new and desire to secure by Letters Patent, is:

1. A windshield wiper comprising a tubular container member of flexible porous material having inwardly folded ends, said container having a filling of granular salt, and a channel-shaped supporting member clamped upon a longitudinal portion of said container member and its contents and clamping the overlapped ends whereby to form a wiper element, said supporting member being provided with means for securing it to a windshield wiper.

2. A windshield wiper element comprising a tubular knitted container having inwardly folded ends and containing a soluble filling material, and a channel-shaped supporting member clamped upon a longitudinal portion of said tubular container member and the infolded ends thereof, the clamped portion of said container being distended within the holder member by the said filling material.

3. A windshield wiper comprising a tubular container member of flexible porous material having inwardly folded ends, said container having a filling of granular salt, and a channel-shaped supporting member clamped upon a longitudinal portion of said container member and its contents and clamping the overlapped ends whereby to form a wiper element.

In witness whereof I have hereunto set my hand.

LOUIS LUNSFORD.